United States Patent
Hou et al.

(10) Patent No.: US 11,856,427 B2
(45) Date of Patent: Dec. 26, 2023

(54) WIRELESS COMMUNICATION ELECTRONIC DEVICE AND METHOD, AND COMPUTER-READABLE STORAGE MEDIUM

(71) Applicants: Sony Corporation, Tokyo (JP); Yanzhao Hou, Beijing (CN)

(72) Inventors: Yanzhao Hou, Beijing (CN); Xiaofeng Tao, Beijing (CN); Min Zhu, Beijing (CN); Xin Guo, Beijing (CN); Zhaoqi Peng, Beijing (CN); Lei Gao, Beijing (CN)

(73) Assignee: SONY CORPORATION, Tokyo (JP)

( * ) Notice: Subject to any disclaimer, the term of this patent is extended or adjusted under 35 U.S.C. 154(b) by 459 days.

(21) Appl. No.: 17/261,880

(22) PCT Filed: Sep. 23, 2019

(86) PCT No.: PCT/CN2019/107256
§ 371 (c)(1),
(2) Date: Jan. 21, 2021

(87) PCT Pub. No.: WO2020/063525
PCT Pub. Date: Apr. 2, 2020

(65) Prior Publication Data
US 2021/0306885 A1 Sep. 30, 2021

(30) Foreign Application Priority Data
Sep. 28, 2018 (CN) .......................... 201811138888.X

(51) Int. Cl.
*H04W 24/08* (2009.01)
*H04W 24/10* (2009.01)
*H04W 84/04* (2009.01)

(52) U.S. Cl.
CPC ........... *H04W 24/08* (2013.01); *H04W 24/10* (2013.01); *H04W 84/042* (2013.01)

(58) Field of Classification Search
CPC ........................... H04W 24/08; H04W 84/042
See application file for complete search history.

(56) References Cited

U.S. PATENT DOCUMENTS

2018/0234889 A1* 8/2018 Baghel ................. H04W 72/30
2019/0150135 A1 5/2019 Lee
(Continued)

FOREIGN PATENT DOCUMENTS

CN 1964208 A 5/2007
CN 101860943 A 10/2010
(Continued)

OTHER PUBLICATIONS

International Search Report and Written Opinion dated Dec. 3, 2019, received for PCT Application PCT/CN2019/107256, Filed on Sep. 23, 2019, 9 pages including English Translation.
(Continued)

*Primary Examiner* — Yaotang Wang
(74) *Attorney, Agent, or Firm* — XSENSUS LLP

(57) ABSTRACT

The present disclosure provides a wireless communication electronic device and method, and a computer-readable storage medium. Said electronic device comprises: a processing circuit, configured to: determine whether there is a need to currently execute measurement of a first channel busy ratio (CBR) on a first resource pool of a sidelink in the long term evolution (LTE) and measurement of a second CBR on a second resource pool of a sidelink in the new radio (NR) radio access technology; and having determined that the first CBR measurement and the second CBR measurement need to be executed currently, executing the first CBR measurement and/or the second CBR measurement at least (Continued)

(a)

(b)

(c)

on the basis of CBR coexistence measurement configuration.

17 Claims, 12 Drawing Sheets

(56) References Cited

U.S. PATENT DOCUMENTS

| | | | | |
|---|---|---|---|---|
| 2020/0053743 | A1* | 2/2020 | Cheng | H04W 4/40 |
| 2020/0288432 | A1* | 9/2020 | Min | H04W 24/10 |
| 2021/0120564 | A1* | 4/2021 | Lee | H04W 4/40 |

FOREIGN PATENT DOCUMENTS

| | | |
|---|---|---|
| CN | 103428749 A | 12/2013 |
| CN | 108307409 A | 7/2018 |
| EP | 3592025 A1 | 1/2020 |
| WO | WO-2017192006 A2 | 11/2017 |
| WO | 2018084590 A1 | 5/2018 |
| WO | WO-2018157611 A1 | 9/2018 |
| WO | WO-2018175553 A1 | 9/2018 |

OTHER PUBLICATIONS

Intel Corporation, "Sidelink Congestion Control for V2X Services", 3GPP TSG RAN WG1 Meeting #87, R1-1611925, Nov. 14-18, 2016, pp. 1-6.

* cited by examiner

WIRELESS COMMUNICATION ELECTRONIC DEVICE AND METHOD, AND COMPUTER-READABLE STORAGE MEDIUM

CROSS-REFERENCE TO RELATED APPLICATIONS

The present application is based on PCT filing PCT/CN2019/107256, filed Sep. 23, 2019, which claims the priority to Chinese Patent Application No. 201811138888.X, titled "WIRELESS COMMUNICATION ELECTRONIC DEVICE AND METHOD, AND COMPUTER-READABLE STORAGE MEDIUM", filed on Sep. 28, 2018 with the China National Intellectual Property Administration, each of which is incorporated herein by reference in its entirety.

FIELD

The present disclosure relates to the technical field of wireless communications, and in particular to coexistence management technology while multiple wireless communication technologies coexist. More specifically, the present disclosure relates to an electronic apparatus and a method for wireless communications and a computer-readable storage medium.

BACKGROUND

New Radio (NR), as a next-generation radio access method for Long Term Evolution (LTE), is a radio access technology (RAT) different from LTE.

In the future, there will be some scenarios where LTE and NR coexist, such as the vehicle to everything (V2X) scenario. In the scenario where LTE V2X and NR V2X coexist, users supporting the two communication technologies of LTE and NR need to adopt a reasonable coexistence management scheme to ensure that both LTE and NR can operate normally.

LTE V2X and NR V2X are both designed so that communications are performed via a sidelink (SL). Generally, a sidelink is provided with a resource pool. User equipment (UE), such as a vehicle UE (VUE), needs to perform channel busy ratio (CBR) measurement on the resource pool. In a case where an LTE sidelink and an NR sidelink coexist, it is required to perform CBR measurement respectively on a resource pool of the LTE sidelink and a resource pool of the NR sidelink.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: determine whether it is required to execute both a first CBR measurement on a first resource pool of an LTE sidelink and a second CBR measurement on a second resource pool of an NR sidelink currently; and in a case of determining it is required to execute both the first CBR measurement and the second CBR measurement currently, execute, at least based on a co-existence CBR measurement configuration, the first CBR measurement and/or the second CBR measurement.

According to an aspect of the present disclosure, a method for wireless communications is provided. The method includes: determining whether it is required to execute both a first CBR measurement on a first resource pool of an LTE sidelink and a second CBR measurement on a second resource pool of an NR sidelink currently; and in a case of determining it is required to execute both the first CBR measurement and the second CBR measurement currently, executing, at least based on a co-existence CBR measurement configuration, the first CBR measurement and/or the second CBR measurement.

According to another aspect of the present disclosure, an electronic apparatus for wireless communications is provided. The electronic apparatus includes processing circuitry. The processing circuitry is configured to: generate a co-existence CBR measurement configuration, for use by user equipment to determine, in a case that it is required to execute both a first CBR measurement on a first resource pool of an LTE sidelink and a second CBR measurement on a second resource pool of an NR sidelink, a solution of executing the first CBR measurement and the second CBR measurement; and provide the co-existence CBR measurement configuration to the user equipment.

According to another aspect of the present disclosure, a method for wireless communications is provided. The method includes: generating a co-existence CBR measurement configuration, for use by user equipment to determine, in a case that it is required to execute both a first CBR measurement on a first resource pool of an LTE sidelink and a second CBR measurement on a second resource pool of an NR sidelink, a solution of executing the first CBR measurement and the second CBR measurement; and providing the co-existence CBR measurement configuration to the user equipment.

With the electronic apparatus and method according to the above aspects, in the case where an LTE sidelink and an NR sidelink coexist, CBR measurement can be performed on the resource pool of the LTE sidelink and on the resource pool of the NR sidelink appropriately, thereby ensuring that communications on the LTE sidelink and communications on the NR sidelink can be performed normally.

According to an aspect of the present disclosure, an electronic apparatus for wireless communications is provided. The electronic apparatus includes processing circuitry. The processing circuitry is configured to: in a case that user equipment supports multi-link transmission, determine whether the user equipment supports dynamical power sharing among links; and in a case of determining that the user equipment supports dynamical power sharing among links, dynamically distribute a total transmission power among multiple links.

According to another aspect of the present disclosure, a method for wireless communications is provided. The method includes: in a case that user equipment supports multi-link transmission, determining whether the user equipment supports dynamical power sharing among links; and in a case of determining that the user equipment supports dynamical power sharing among links, dynamically distributing a total transmission power among multiple links.

With the electronic apparatus and method according to the above aspects, dynamic power sharing among links can be realized, thereby distributing the power reasonably.

According to an aspect of the present disclosure, an electronic apparatus for wireless communications is provided. The electronic apparatus includes processing circuitry. The processing circuitry is configured to: determine a measurement configuration for measuring a received signal strength indication (RSSI) of an NR sidelink, wherein the measurement configuration includes information indicating positions of orthogonal frequency division multiplexing (OFDM) symbols for measurement of the received signal strength indication in a subframe; and execute the measurement of the received signal strength indication of the NR sidelink based on the measurement configuration.

According to another aspect of the present disclosure, a method for wireless communications is provided. The method includes: determining a measurement configuration for measuring a RSSI of an NR sidelink, wherein the measurement configuration includes information indicating positions of OFDM symbols for measurement of the received signal strength indication in a subframe; and executing the measurement of the received signal strength indication of the NR sidelink based on the measurement configuration.

With the electronic apparatus and method according to the above aspects, flexible measurement configuration for measuring the RSSI of the NR sidelink can be realized.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

Figure 2:
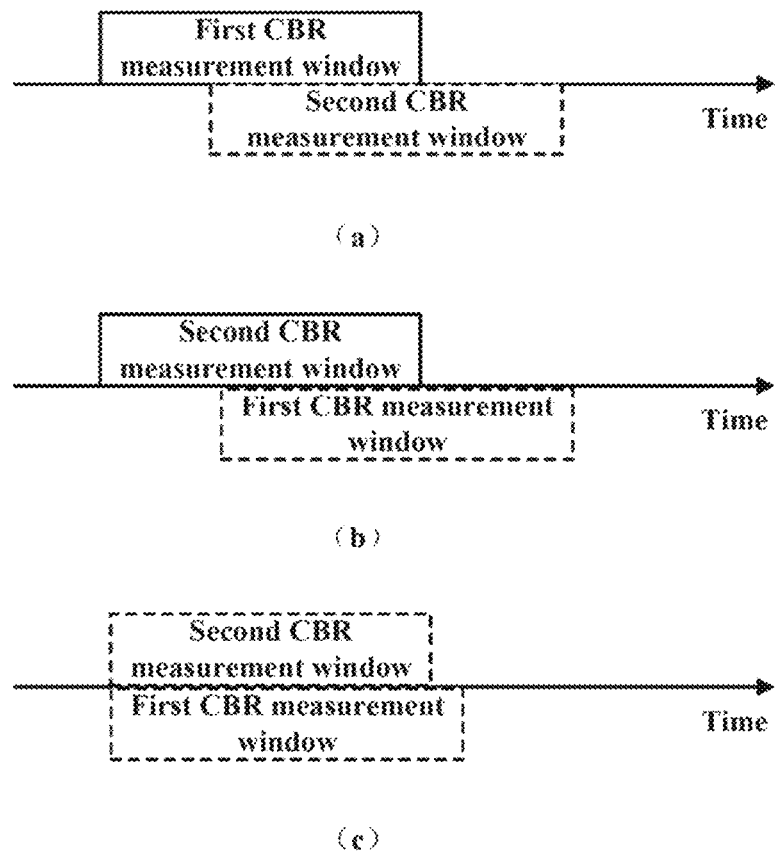
Figure 3:
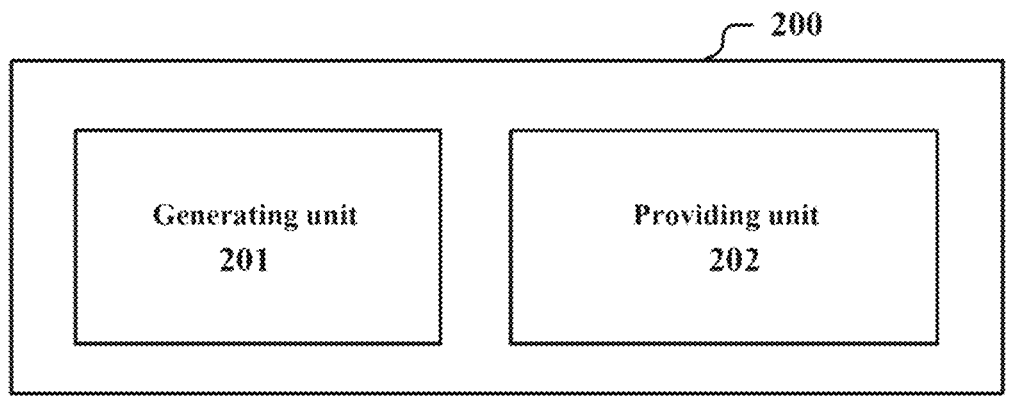
Figure 4:
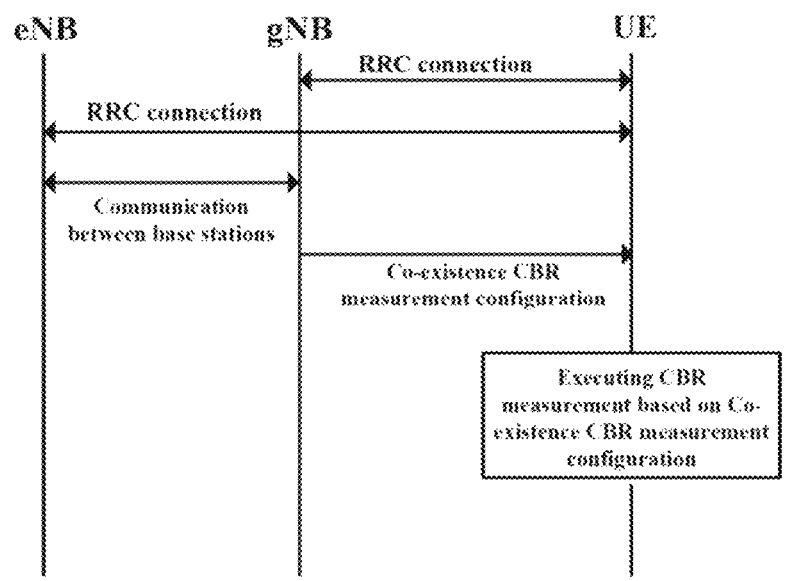
Figure 5:
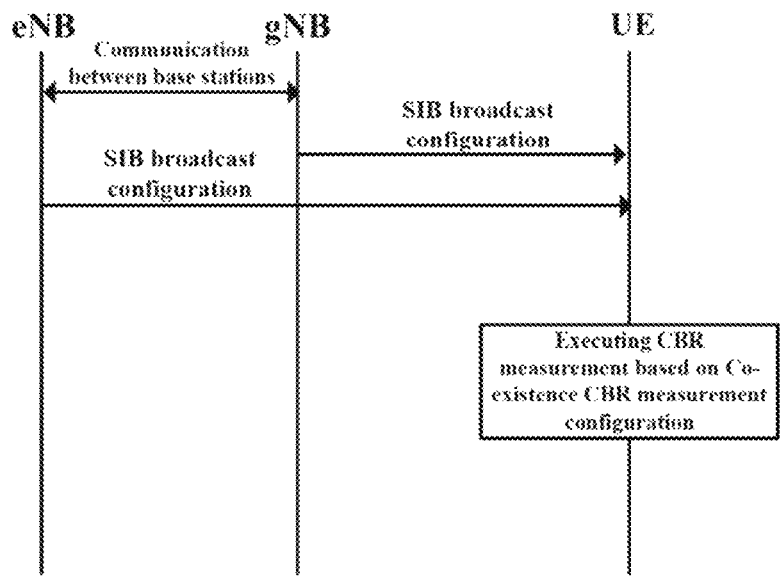
Figure 6:
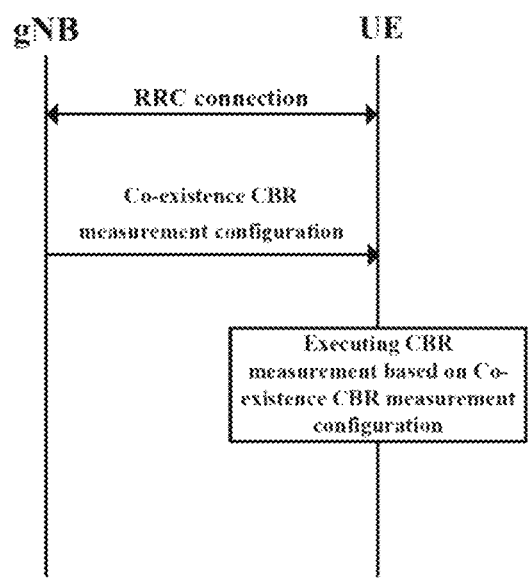
Figure 7:
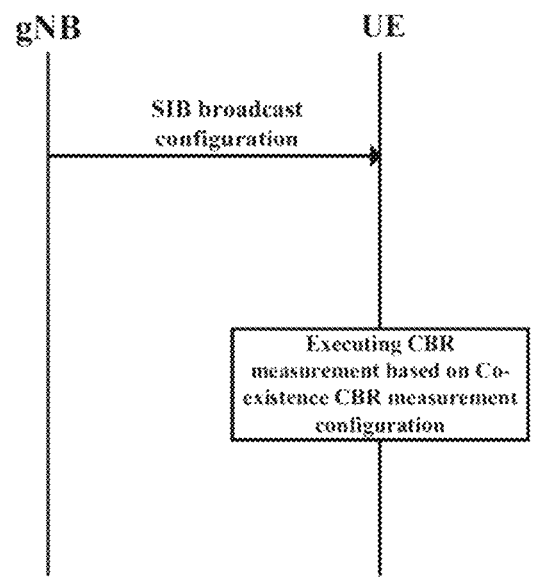
Figure 8:
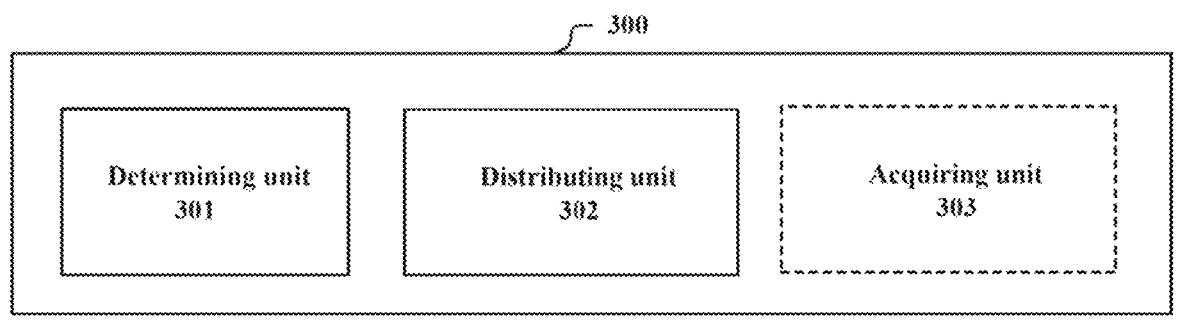
Figure 9:
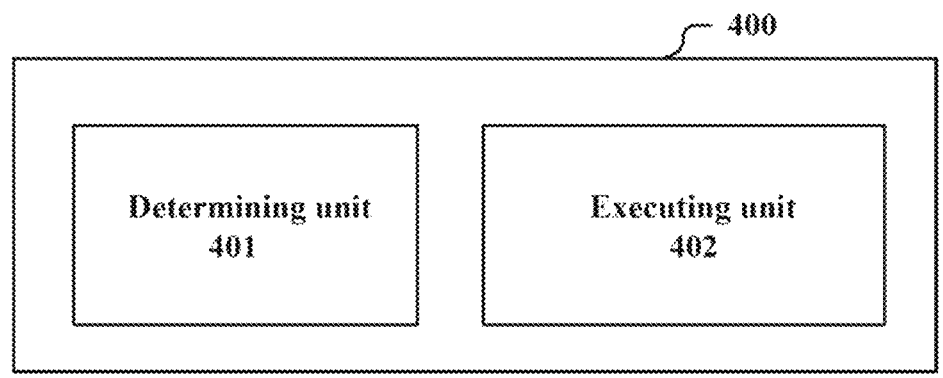
Figure 10:
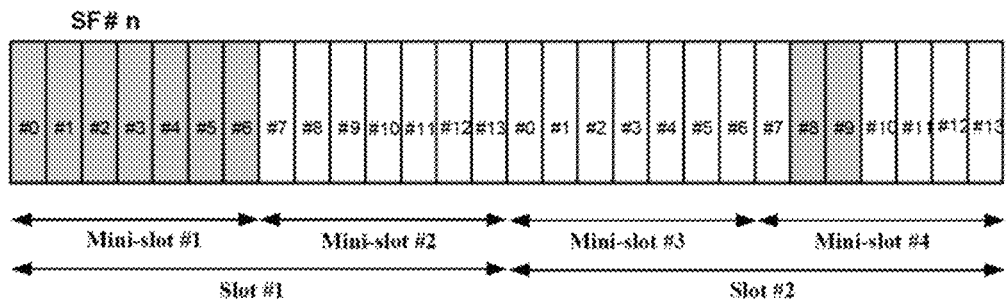
Figure 11:
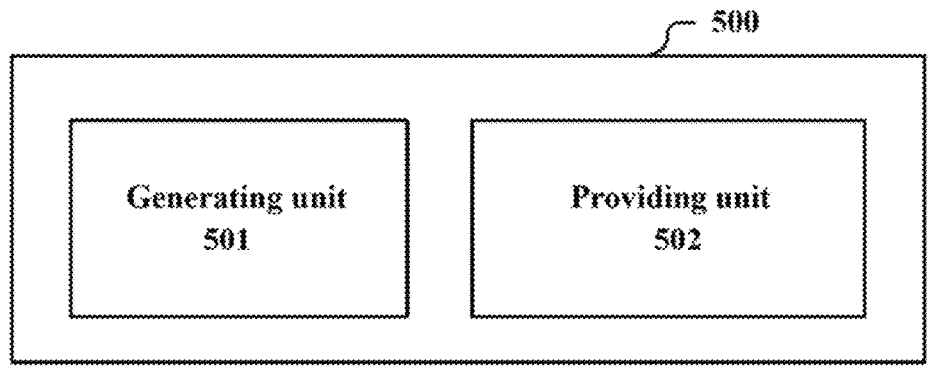
Figure 12:
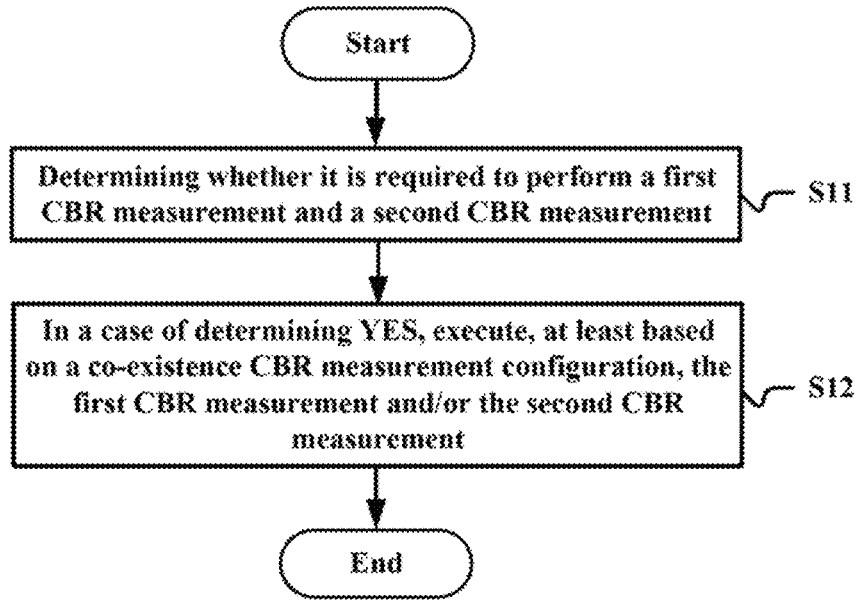
Figure 13:
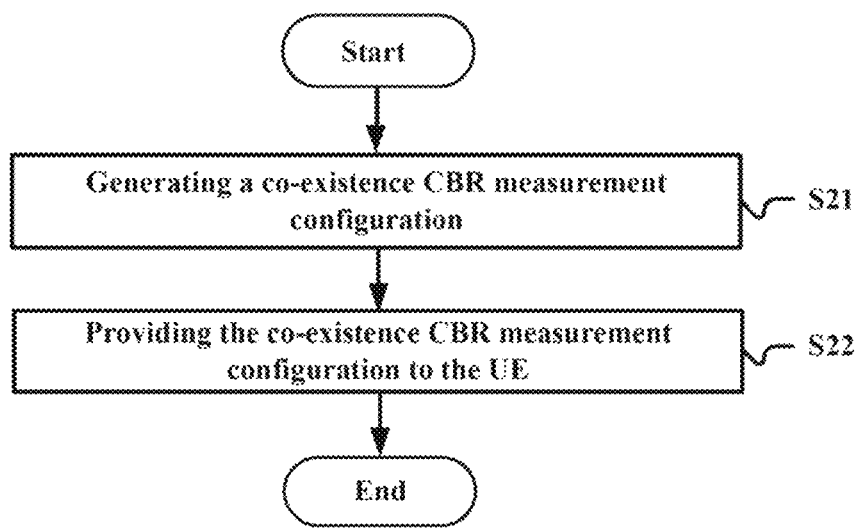
Figure 14:
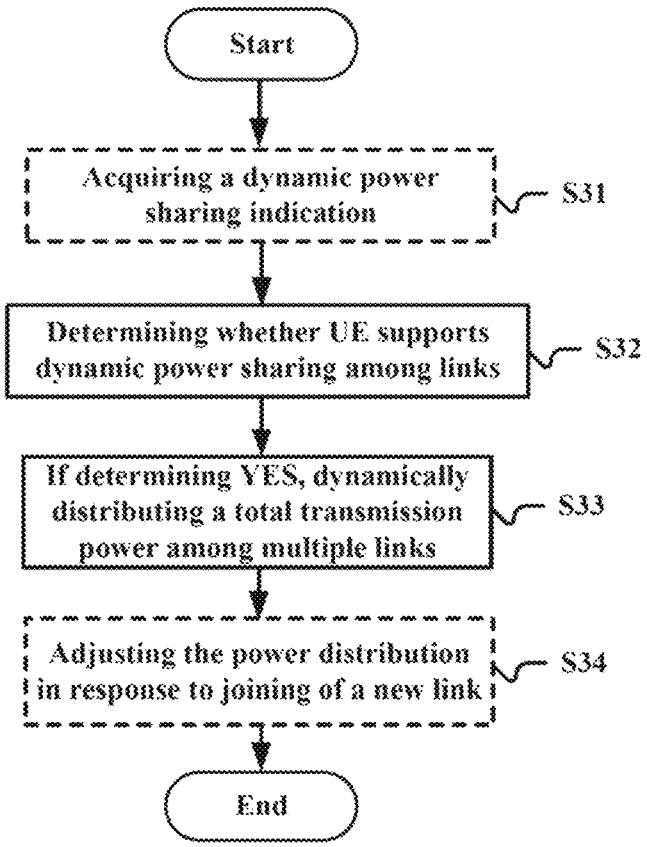
Figure 15:
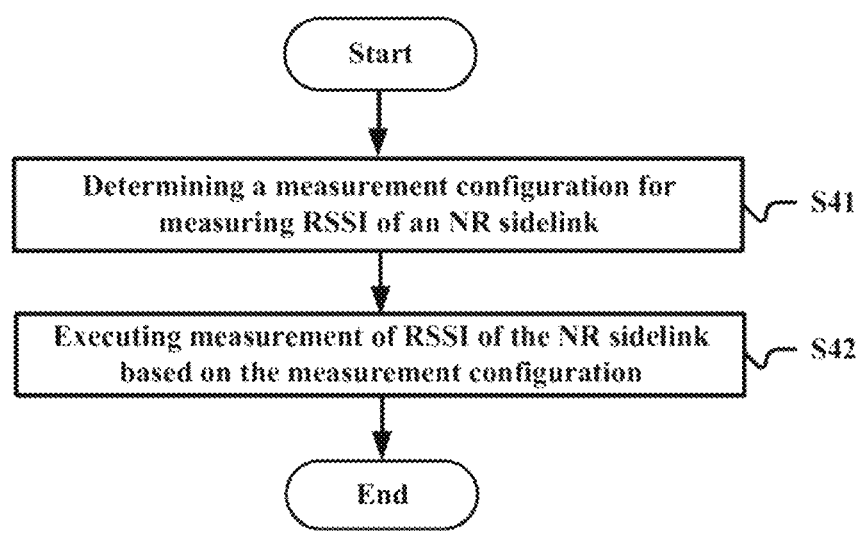
Figure 16:
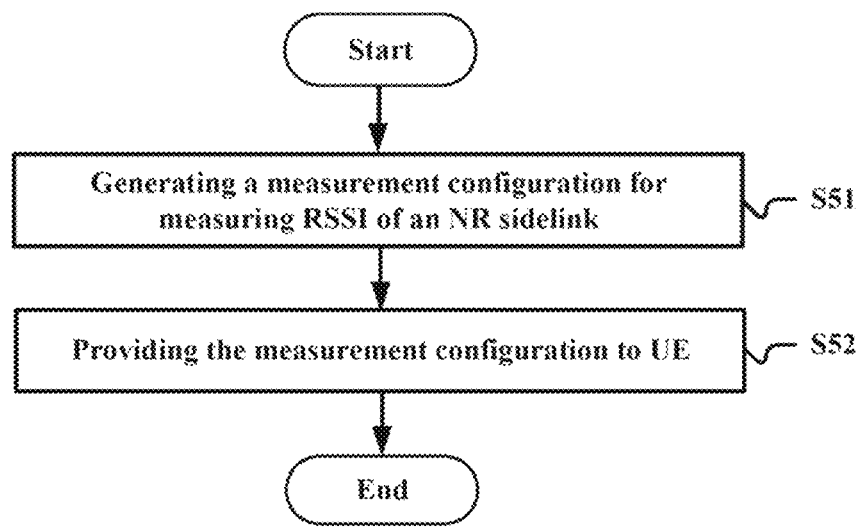
Figure 17:
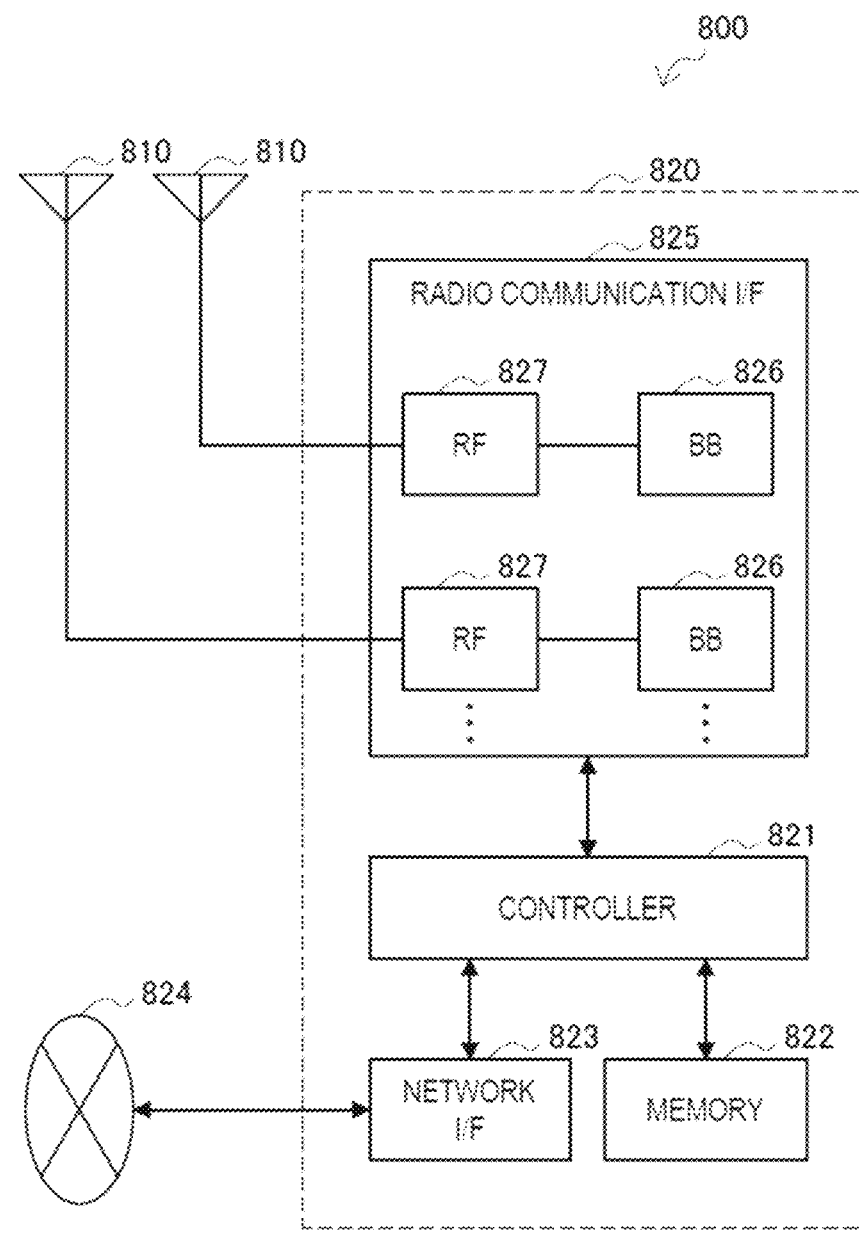
Figure 18:
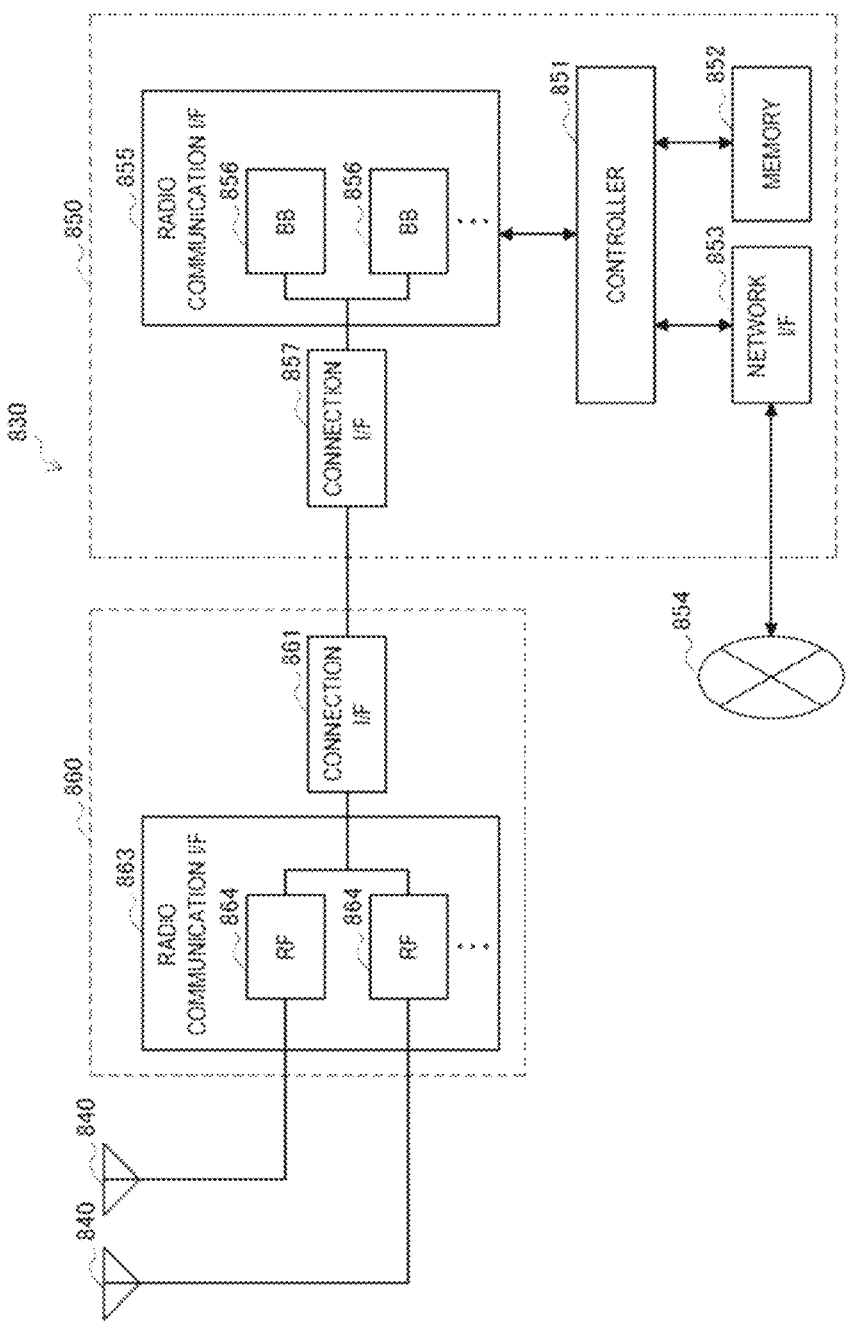
Figure 19:
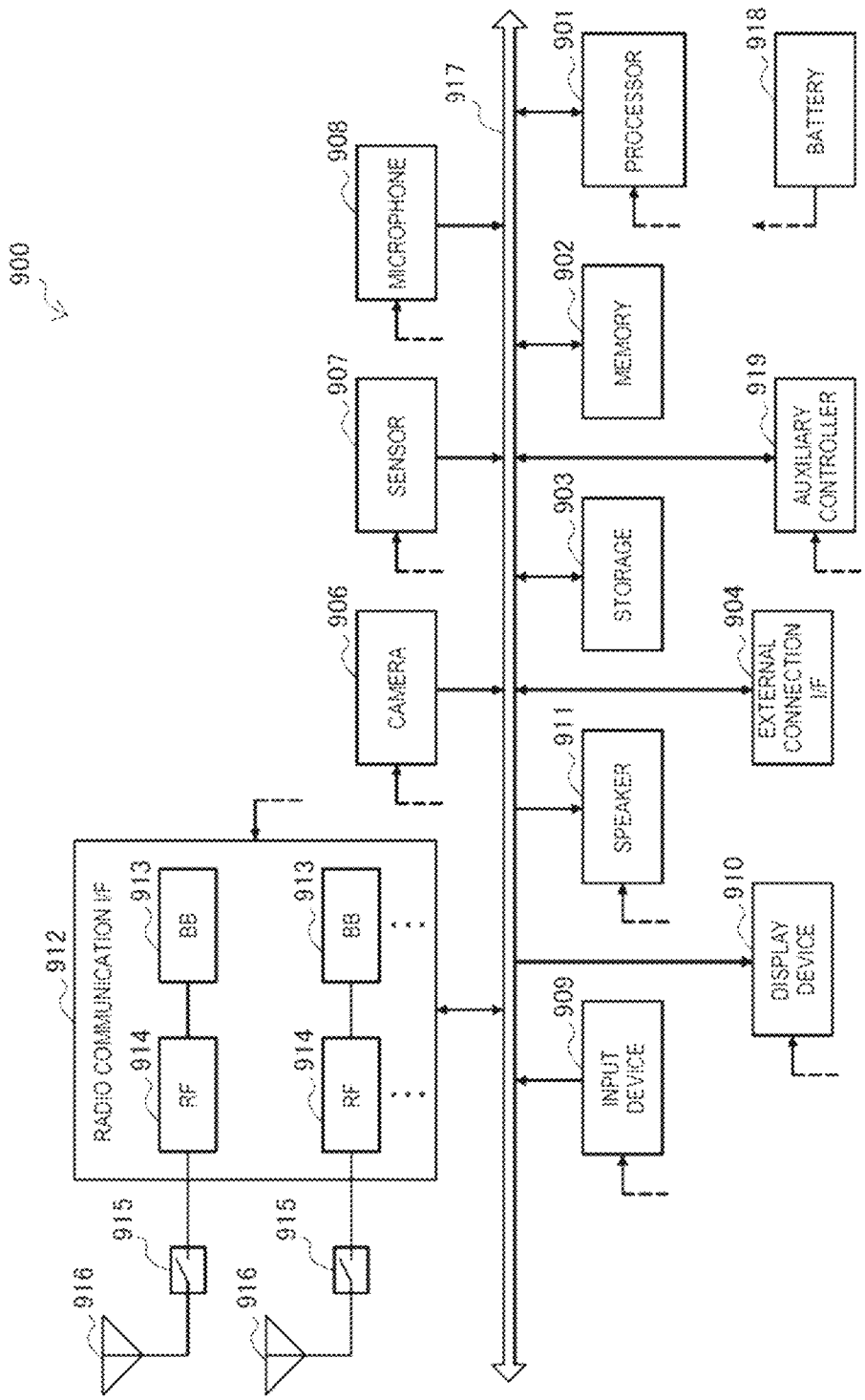
Figure 20:
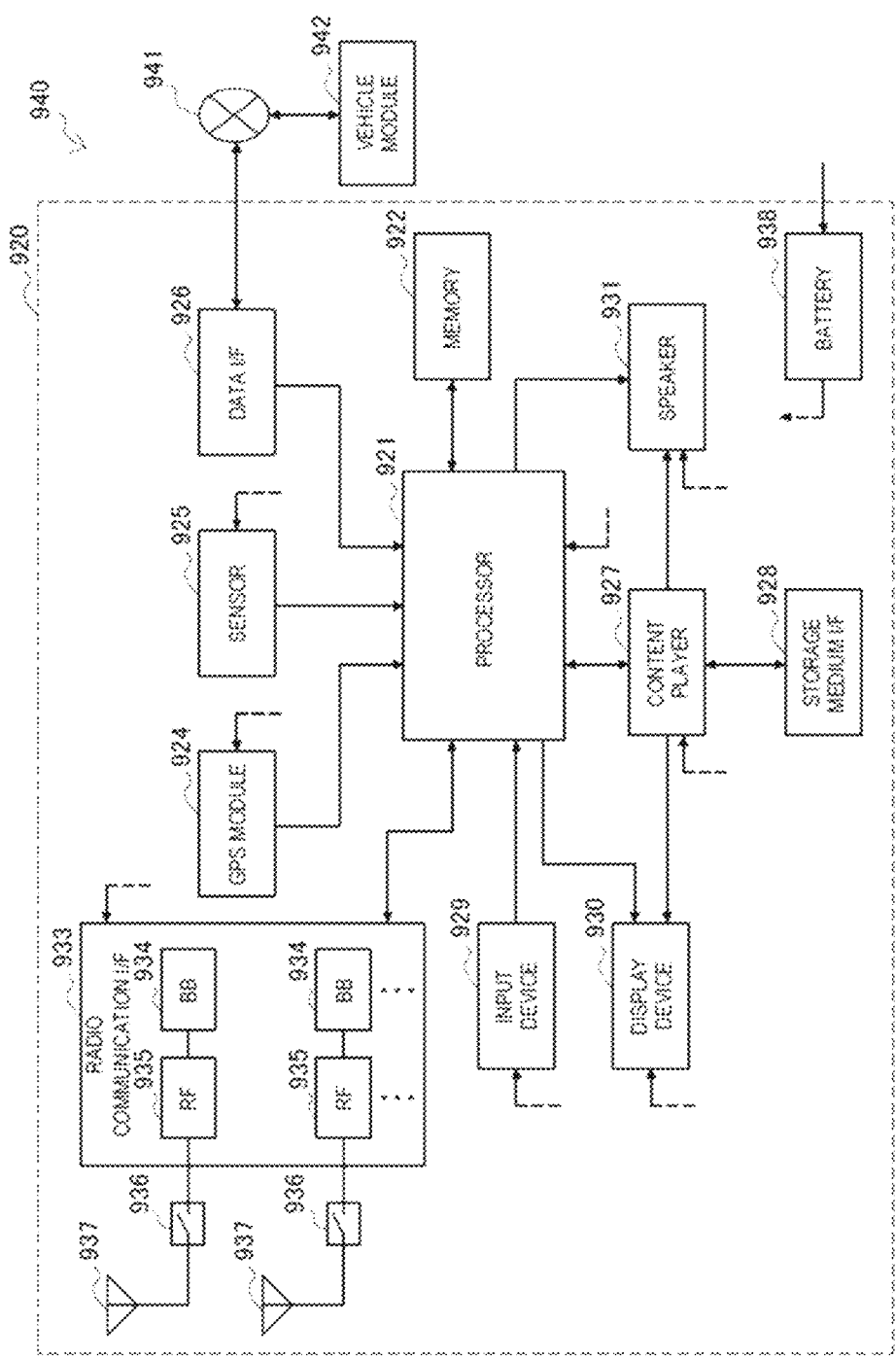
Figure 21:
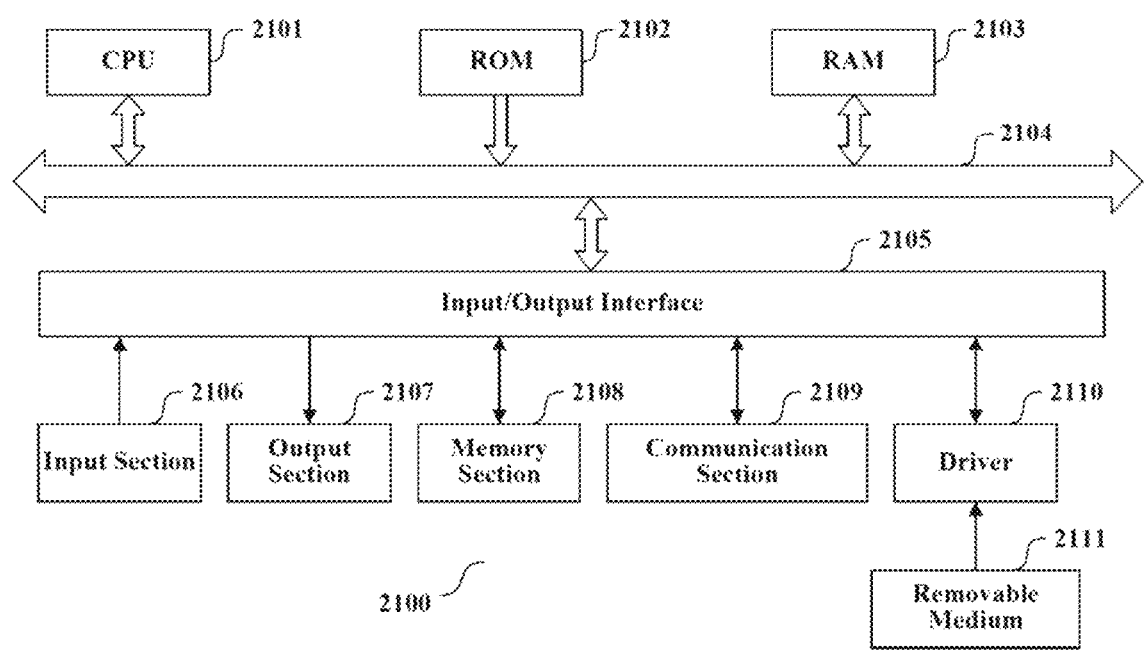

(a) to (c) in FIG. 2 show schematic diagrams of three cases in which a first CBR measurement and a second CBR measurement are required to be performed, respectively;

FIG. 3 is a block diagram showing functional modules of an electronic apparatus for wireless communications according to another embodiment of the present disclosure;

FIG. 4 and FIG. 5 are schematic diagrams showing information procedures between base stations and UE in a case that the UE locates both within coverage of an LTE base station (eNB) and coverage of an NR base station (gNB);

FIG. 6 and FIG. 7 are schematic diagrams showing information procedures between a base station and UE in a case that the UE locates within coverage of an NR base station but outside of coverage of an LTE base station;

FIG. 8 is a block diagram showing functional modules of an electronic apparatus for wireless communications according to another embodiment of the present disclosure;

FIG. 9 is a block diagram showing functional modules of an electronic apparatus for wireless communications according to another embodiment of the present disclosure;

FIG. 10 is a schematic diagram showing an example of a subframe in an NR system;

FIG. 11 is a block diagram showing functional modules of an electronic apparatus for wireless communications according to another embodiment of the present disclosure;

FIG. 12 is a flow chart of a method for wireless communications according to an embodiment of the present disclosure;

FIG. 13 is a flow chart of a method for wireless communications according to another embodiment of the present disclosure;

FIG. 14 is a flow chart of a method for wireless communications according to another embodiment of the present disclosure;

FIG. 15 is a flow chart of a method for wireless communications according to another embodiment of the present disclosure;

FIG. 16 is a flow chart of a method for wireless communications according to another embodiment of the present disclosure;

FIG. 17 is a block diagram showing a first example of an exemplary configuration of a gNB to which the technology according to the present disclosure may be applied;

FIG. 18 is a block diagram showing a second example of an exemplary configuration of the gNB to which the technology according to the present disclosure may be applied;

FIG. 19 is a block diagram showing an example of an exemplary configuration of a smartphone to which the technology according to the present disclosure may be applied;

FIG. 20 is a block diagram showing an example of an exemplary configuration of a car navigation apparatus to which the technology according to the present disclosure may be applied; and FIG. 21 is a block diagram of an exemplary block diagram illustrating the structure of a general purpose personal computer capable of realizing the method and/or device and/or system according to the embodiments of the present disclosure.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and timeconsuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, there are scenarios where an LTE sidelink and an NR sidelink coexist. In the scenarios, both CBR measurement for LTE and CBR measurement for NR are to be performed, and thus it is required to configure and coordinate the two kinds of CBR measurement. In the description of this application, a V2X scenario is taken as an example of an application scenario, which is not limitative. The technology according to the present disclosure can be applied to any scenario where an LTE sidelink and an NR sidelink coexist.

Figure 1:
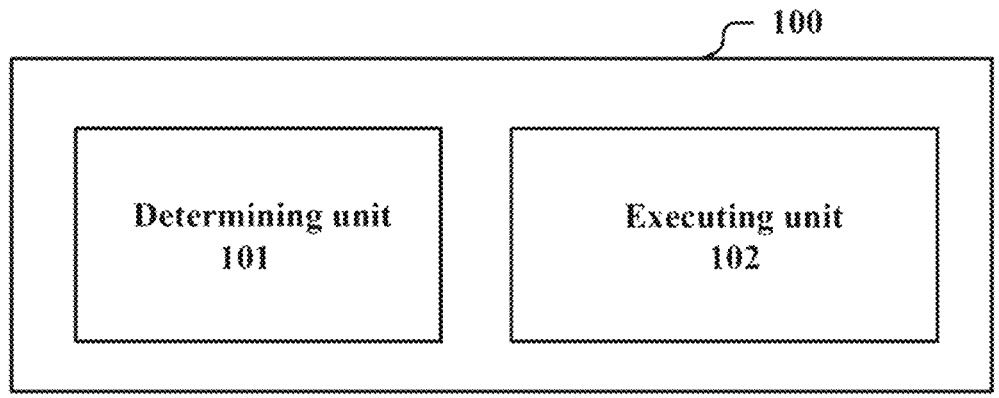
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a determining unit 101, configured to determine whether it is required to execute both a first CBR measurement on a first resource pool of an LTE sidelink and a second CBR measurement on a second resource pool of an NR sidelink currently; and a executing unit 102, configured to, in a case of determining it is required to execute both the first CBR measurement and the second CBR measurement currently, execute, at least based on a co-existence CBR measurement configuration, the first CBR measurement and/or the second CBR measurement.

The determining unit 101 and the executing unit 102 may be implemented by one or more processing circuitries, and the processing circuitry may be, for example, implemented as a chip or a processor. Moreover, it should be noted that, functional units in the apparatus shown in FIG. 1 are only logic modules which are divided based on the specific functions thereof, and are not intended to limit the implementations, which is also applicable to examples of other electronic apparatus to be described later.

The electronic apparatus 100, for example, may be arranged on UE side or may be communicatively connected to UE. It should be noted that the electronic apparatus 100 may be implemented at a chip level or a device level. For example, the electronic apparatus 100 may function as user equipment itself, and may include external devices such as a memory and a transceiver (not shown in FIG. 1). The memory may store programs and related data information for implementing various functions by the user equipment. The transceiver may include one or more communication interfaces to support communication with various devices (for example, a base station, other user equipment and the like). The specific implementations of the transceiver are not limited herein. This is also applicable to descriptions of other configuration examples of the electronic apparatus on the user equipment side to be described later.

It should be noted that the terms of first, second and the like herein are used only for distinguishing, and do not represent any meanings of order. In the embodiment, the LTE sidelink corresponds to the first resource pool, and the NR sidelink corresponds to the second resource pool. The first resource pool and the second resource pool may have overlapping parts, or may not overlap at all.

The determining unit 101 determines it is required to execute both the first CBR measurement (that is, CBR measurement for the LTE) and the second CBR measurement (that is, CBR measurement for the NR), for example, in the following cases: the first CBR measurement is currently being executed, and the second CBR measurement is required to be executed before the first CBR measurement is completed; the second CBR measurement is currently being executed, and the first CBR measurement is required to be executed before the second CBR measurement is completed; and the first CBR measurement and the second CBR measurement are to be executed in a subsequent period of time. For ease of understanding, (a) to (c) in FIG. 2 show schematic diagrams of the three cases, where a dashed line block represent the CBR measurement which is expected to be executed. The length of the first CBR measurement window and the length of the second CBR measurement window may be the same or different.

The co-existence CBR measurement configuration may be used to specify how to execute both the first CBR measurement and the second CBR measurement simultaneously. In a case that the determining unit 101 determines that it is required to execute both the first CBR measurement and the second CBR measurement, the executing unit 102 may execute the first CBR measurement and/or the second CBR measurement based on the co-existence CBR measurement configuration, or based on the co-existence CBR measurement configuration and information related to the UE itself.

In an example, the co-existence CBR measurement configuration includes a determination rule for a solution of executing the first CBR measurement and the second CBR measurement in a case that capability of the user equipment available for the CBR measurement cannot meet a requirement. Specifically, a receiver can only execute one kind of CBR measurement at a time. The first CBR measurement and the second CBR measurement cannot be executed simultaneously in a case that there is only one receiver available for the CBR measurement.

For example, the determination rule may include one or more of the following: whether to allow initiation of another CBR measurement during a period of a CBR measurement being executed; whether to allow reuse of a measurement result of the first CBR measurement and a measurement result of the second CBR measurement in a case that the first resource pool and the second resource pool overlap with each other; alternately executing the first CBR measurement and the second CBR measurement within a measurement window; and executing only one of the first CBR measurement and the second CBR measurement within the measurement window.

In a case that initiation of another CBR measurement is allowed during a period of a CBR measurement being executed, the CBR measurement being executed may be interrupted immediately to start another CBR measurement or another CBR measurement may be started after a predetermined time period. Moreover, whether to execute the interruption and when to execute the interruption may be determined in conjunction with other rules.

For example, in a case that initiation of another CBR measurement is allowed during a period of a CBR measurement being executed, if the determination rule further includes alternately executing the first CBR measurement and the second CBR measurement within the measurement window, the first CBR measurement and the second CBR measurement may be alternately executed at a predetermined alternating frequency. The predetermined alternating frequency may be included in the co-existence CBR measurement configuration or may be a fixed frequency. In addition, the determination rule may further include a selection rule for selecting a CBR measurement to be executed firstly in the case of alternately executing the first CBR measurement and the second CBR measurement, such as firstly executing the CBR measurement being executed or executing the first CBR measurement firstly.

On the other hand, in a case that the initiation of another CBR measurement is not allowed during a period of a CBR measurement being executed, the determination rule does not include alternately executing the first CBR measurement and the second CBR measurement within the measurement window. Moreover, another CBR measurement may be started after the current CBR measurement is completed.

In a case that the determination rule includes executing only one of the first CBR measurement and the second CBR measurement within the measurement window, the determination rule further includes selection rules for selecting the first CBR measurement or the second CBR measurement. Similarly, the selection rules may also be applied to the case where the determination rule includes alternately executing the first CBR measurement and the second CBR measurement within the measurement window, to select the CBR measurement to be executed firstly.

In the embodiment, the measurement window may be a window of the first CBR measurement or a window of the second CBR measurement. For example, if only the first CBR measurement is executed, the measurement window is the window of the first CBR measurement; and if only the second CBR measurement is executed, the measurement window is the window of the second CBR measurement. In addition, if the first CBR measurement and the second CBR measurement are executed alternately, the measurement window may be, for example, the longer one of the window of the first CBR measurement and the window of the second CBR measurement, or a window having a length equal to the sum of the lengths of the window of the first CBR measurement and the window of the second CBR measurement.

As an example, the selection rule may be based on one or more of the following: pre-specification; historical conditions of the first CBR measurement and historical conditions of the second CBR measurement; a service requirement of the LTE sidelink and a service requirement of the NR sidelink; and a power requirement of the first CBR measurement and a power requirement of the second CBR measurement.

Specifically, one of the first CBR measurement and the second CBR measurement may be specified in advance. For example, it may be configured to execute the first CBR measurement if the measurement capability is not sufficient. For example, in the V2X scenario, the LTE sidelink carries information in the aspect of road safety, and thus CBR measurement of the LTE sidelink may be performed preferentially.

Alternatively, the selection may be made based on the service requirement of the LTE sidelink and the service requirement of the NR sidelink. For example, service requirement may include one or more of the following aspects: a delay requirement, a reliability requirement, and a service category. For example, the selection rule may include selecting the CBR measurement of a sidelink which has higher delay requirement, higher reliability requirement, or carries a particular category of service (such as carrying safety-related service). Alternatively, a comprehensive evaluation may be performed by weighting multiple aspects of the service requirement of each of the sidelinks to select a sidelink having a highest resultant index to execute the CBR measurement.

In addition, the selection may be made based on the power requirement of the first CBR measurement and the power requirement of the second CBR measurement. For example, if the remaining power of the UE is low, the CBR measurement with a lower power requirement may be selected for executing.

On the other hand, the selection may also be made based on the historical conditions of the first CBR measurement and the historical conditions of the second CBR measurement. For example, the number of times that the first CBR measurement is continuously executed or the number of times that the second CBR measurement is continuously executed does not exceed a predetermined threshold, thereby avoiding a case where a kind of CBR measurement cannot be executed for a long time. Alternatively, the selection may be performed to ensure that the time period in which a certain CBR measurement is not executed successfully does not exceed a predetermined time period. The predetermined threshold or the predetermined time period may be included in the determination rule.

It should be understood that the selection rules in the above cases may be used in combination as appropriate. For example, the CBR measurement to be executed is selected based on the service requirement of the LTE sidelink and the service requirement of the NR sidelink while ensuring that the number of times that the first CBR measurement is continuously executed or the number of times that the second CBR measurement is continuously executed does not exceed the predetermined threshold, or the like.

As mentioned above, the determination rule further includes whether to allow the reuse of a measurement result of the first CBR measurement and a measurement result of the second CBR measurement in a case that the first resource pool and the second resource pool overlap with each other. For example, if the reuse of the measurement result of the first CBR measurement and the measurement result of the second CBR measurement is allowed in the case that the first resource pool and the second resource pool overlap with each other, the executing unit 102 is configured to reuse the measurement result of the first CBR measurement and the measurement result of the second CBR measurement in a case that the subframe structure of the LTE sidelink is the same as the subframe structure of the NR sidelink. That is, if one of the first CBR measurement and the second CBR measurement is executed, a part of the measurement result for the overlapping part of the first resource pool and the second resource pool is also taken as a part of the measurement result of the other CBR measurement, thereby saving measurement overhead.

In another example, the co-existence CBR measurement configuration further includes allowing the first CBR measurement and the second CBR measurement to be executed in parallel in a case that the capability of the UE available for the CBR measurement can meet the requirement. For example, if the UE includes two or more receivers and at least two receivers may be used for the CBR measurement, the UE may execute the first CBR measurement and the second CBR measurement in parallel.

The co-existence CBR measurement configuration may further include configuration of whether to support dynamic power sharing between the first CBR measurement and the second CBR measurement in a case that the first CBR measurement and the second CBR measurement are executed in parallel. In a case that the dynamic power sharing is supported, the executing unit 102 may dynamically distribute the power used for CBR measurement between the first CBR measurement and the second CBR measurement, improving the flexibility of CBR measurement configuration in coexistence scenarios. The co-existence CBR measurement configuration may further include a priority level of the CBR measurement for which power is distributed. For example, measurement power is distributed to the first CBR measurement preferentially if the first CBR measurement has a higher priority level, and vice versa. If the co-existence CBR measurement configuration does not include the specification for the priority level of the CBR measurement, for example, the measurement power may be distributed based on a priority level of the service carried by the link by default.

In a case that the dynamic power sharing is not supported, the measurement power, for example, may be evenly distributed to the first CBR measurement and the second CBR measurement, or may be distributed to the first CBR measurement and the second CBR measurement at a preset ratio.

In addition, in a case that the physical sidelink control channel (PSCCH) and the physical sidelink shared channel (PSSCH) of the NR sidelink are not adjacent, it is required to execute CBR measurements for the PSCCH and the PSSCH respectively. If the capability of the UE available for the CBR measurement is sufficient, the CBR measurement for the PSCCH and the CBR measurement for the PSSCH may be executed simultaneously.

In addition, the co-existence CBR measurement configuration may further include configuration for measurement report, and the configuration for measurement report includes reporting to an NR base station a case that the second CBR measurement continuously fails for a predetermined number of times. Alternatively, the configuration for measurement report may further include reporting to an NR base station (gNB) a case that the first CBR measurement continuously fails a predetermined number of times. By acquiring such measurement report, the NR base station, for example, may adjust the co-existence CBR measurement configuration accordingly.

At least a part of the co-existence CBR measurement configuration may be acquired via a radio resource control (RRC) signaling or a system information block (SIB), such as System Information BlocType21. Alternatively, at least a part of the co-existence CBR measurement configuration may be pre-configured or pre-stored in the UE. It should be understood that the co-existence CBR measurement configuration may be completely pre-configured or pre-stored, or acquired completely from the base station side via the RRC signaling or SIB.

For example, in a case that the UE locates within coverage of an NR base station and establishes an RRC connection with the NR base station, the UE may acquire the co-existence CBR measurement configuration via the RRC signaling. In this case, the UE may first detect CBR measurement requirement and measurement capability of the UE, and the UE acquires the co-existence CBR measurement configuration only when the measurement capability of the UE does not meet the measurement requirement. In the case that the UE locates within the coverage of the NR base station, the UE may acquire the co-existence CBR measurement configuration via the SIB. In a case that the UE locates outside of the coverage of the NR base station, the UE cannot acquire the co-existence CBR measurement configuration via the RRC signaling or the SIB. In this case, the co-existence CBR measurement configuration pre-configured in the UE or the co-existence CBR measurement configuration pre-stored in the UE may be used.

If all the three ways for acquiring the co-existence CBR measurement configuration are available, the priority levels of these three ways may be configured as: RRC signaling>SIB>pre-configured or pre-stored. That is, the priority level for the way of acquiring through RRC signaling is higher than that for the way of acquiring through SIB, and the priority level for the way of acquiring through SIB is higher than that for the way of being pre-configured or pre-stored.

In summary, with the electronic apparatus 100 according to the embodiment of the present disclosure, CBR measurements can be executed on the resource pool of the LTE sidelink and on the resource pool of the NR sidelink appropriately in the case that the LTE sidelink and the NR sidelink coexist, thereby ensuring that communications on the LTE sidelink and communications on the NR sidelink can be performed normally.

Second Embodiment

FIG. 3 is a block diagram showing functional modules of an electronic apparatus 200 for wireless communications according to another embodiment of the present disclosure. As shown in FIG. 3, the electronic apparatus 200 includes: a generating unit 201, configured to generate a co-existence CBR measurement configuration, for use by user equipment to determine, in a case that it is required to execute both a first CBR measurement on a first resource pool of an LTE sidelink and a second CBR measurement on a second resource pool of an NR sidelink, a solution of executing the first CBR measurement and the second CBR measurement; and a providing unit 202, configured to provide the co-existence CBR measurement configuration to the user equipment.

The generating unit 201 and the providing unit 202 may be implemented by one or more processing circuitries, and the processing circuitry, for example, may be implemented as a chip. Moreover, it should be noted that, functional units in the electronic apparatus shown in FIG. 3 are only logic modules which are divided based on the specific functions thereof, and are not intended to limit the implementations.

The electronic apparatus 200, for example, may be arranged on a base station side or may be communicatively connected to a base station. It should be noted that the electronic apparatus 200 may be implemented at a chip level or a device level. For example, the electronic apparatus 200 may operate as a base station itself, and may further include an external device such as a memory and a transceiver (not shown in FIG. 3). The memory may be configured to store programs and related data information for implementing various functions by the base station. The transceiver may include one or more communication interfaces to support communication with different devices (for example, user equipment, other base station or the like). The implementation of the transceiver is not limited here.

The co-existence CBR measurement configuration in the embodiment has the same meaning as the co-existence CBR measurement configuration in the first embodiment. For example, the co-existence CBR measurement configuration includes a determination rule for a solution of executing the first CBR measurement and the second CBR measurement in a case that capability of the user equipment available for a CBR measurement cannot meet a requirement. The determination rule includes, for example, one or more of the following: whether to allow initiation of another CBR measurement during a period of a CBR measurement being executed; whether to allow reuse of a measurement result of the first CBR measurement and a measurement result of the second CBR measurement in a case that the first resource pool and the second resource pool overlap with each other; alternately executing the first CBR measurement and the second CBR measurement within a measurement window; and executing only one of the first CBR measurement and the second CBR measurement within the measurement window. The measurement window may be a window of the first CBR measurement or a window of the second CBR measurement.

The determination rule further includes a selection rule for selecting the first CBR measurement or the second CBR measurement, and the selection rule can be based on one or more of the following: pre-determination; historical conditions of the first CBR measurement and historical conditions of the second CBR measurement; a service requirement of the LTE sidelink and a service requirement of the NR sidelink; and a power requirement of the first CBR measurement and a power requirement of the second CBR measurement. The service requirement may include one or more of the following aspects: a delay requirement, a reliability requirement, and a service category.

On the other hand, the co-existence CBR measurement configuration further includes allowing the UE to execute the first CBR measurement and the second CBR measurement in parallel in a case that the capability of the UE available for the CBR measurement can meet the requirement. In addition, the co-existence CBR measurement configuration further includes configuration of whether to support dynamic power sharing between the first CBR measurement and the second CBR measurement in a case that the first CBR measurement and the second CBR measurement are executed in parallel.

The co-existence CBR measurement configuration further includes configuration for measurement report, so that the UE reports to an NR base station a case that the second CBR measurement continuously fails for a predetermined number of times and/or the first CBR measurement continuously fails for a predetermined number of times.

The details of the co-existence CBR measurement configuration are described in the first embodiment, and are not repeated herein.

The providing unit 202 may provide the generated co-existence measurement configuration to the UE, for example, via a RRC signaling or an SIB. For ease of understanding, FIG. 4 and FIG. 5 are schematic diagrams showing information procedures between base stations and UE in a case that the UE locates both within coverage of an LTE base station (eNB) and coverage of an NR base station (gNB). FIG. 6 and FIG. 7 are schematic diagrams showing information procedures between a base station and UE in a case that the UE locates within coverage of an NR base station but outside of coverage of an LTE base station.

In FIG. 4, the RRC connection is established between the UE and the base stations (eNB and gNB), and UE receives the co-existence CBR measurement configuration via the RRC connection with the gNB. Then, the UE executes the CBR measurement based on the co-existence CBR measurement configuration, the details of which are described in the first embodiment. In addition, the UE may firstly detect CBR measurement requirement and measurement capability of the UE, and receive the co-existence CBR measurement configuration only when the capability of the UE cannot meet the CBR measurement requirement. FIG. 5 is different from FIG. 4 in that the UE receives the co-existence CBR measurement configuration via the SIB instead of via the RRC connection.

In FIG. 4 and FIG. 5, the eNB and the gNB may communicate with each other. For example, the eNB and the gNB may exchange information about the CBR measurement configuration or measurement results. In addition, the eNB and the gNB may further exchange information about the configuration of the transmission resource pool and feedback from the UE side.

In FIG. 6, the RRC connection is established between the UE and the gNB, and UE receives the co-existence CBR measurement configuration via the RRC connection. Then, the UE executes the CBR measurement based on the co-existence CBR measurement configuration. Similarly, the UE may firstly detect the CBR measurement requirement and measurement capability of the UE, and receive the co-existence CBR measurement configuration only when the capability of the UE cannot meet the CBR measurement requirement. FIG. 7 is different from FIG. 6 in that the UE receives the co-existence CBR measurement configuration via the SIB instead of via the RRC connection.

In FIG. 6 and FIG. 7, the UE locates outside of the coverage of the LTE base station, and thus no information is exchanged between the UE and the LTE base station. In addition, no communication or coordination is executed between the eNB and the gNB.

It should be understood that the above information procedures are only exemplary and not limiting.

With the electronic apparatus 200 according to the embodiment of the present disclosure, CBR measurements can be executed on the resource pool of the LTE sidelink and on the resource pool of the NR sidelink appropriately in the case that the LTE sidelink and the NR sidelink coexist, thereby ensuring that communications on the LTE sidelink and communications on the NR sidelink can be performed normally.

Third Embodiment

FIG. 8 is a block diagram showing functional modules of an electronic apparatus 300 for wireless communications according to another embodiment of the present disclosure. As shown in FIG. 8, the electronic apparatus includes: a determining unit 301 configured to, in a case that UE supports multi-link transmission, determine whether the UE supports dynamical power sharing among links; and a distributing unit 302, configured to, in a case of the determining unit 301 determining that the UE supports dynamical power sharing among links, dynamically distribute a total transmission power among multiple links.

The determining unit 301 and the distributing unit 302 may be implemented by one or more processing circuitries, and the processing circuitry, for example, may be implemented as a chip or a processor. Moreover, it should be noted that, functional units in the electronic apparatus shown in FIG. 8 are only logic modules which are divided based on the specific functions thereof, and are not intended to limit the implementations.

The electronic apparatus 300, for example, may be arranged on a UE side or may be communicatively connected to a UE. It should be noted that the electronic apparatus 300 may be implemented at a chip level or a device level. For example, the electronic apparatus 300 may function as user equipment, and may include an external device such as a memory and a transceiver (not shown in FIG. 8). The memory may be configured to store programs and related data information for implementing various functions by the user equipment. The transceiver may include one or more communication interfaces to support communication with different devices (for example, a base station, other user equipment or the like). The implementation of the transceiver is not limited here.

For example, the multiple links may include two or more of the following: LTE uplink, LTE sidelink, NR uplink, and NR sidelink. Since the total transmission power of the UE is a certain value, transmission power may be dynamically distributed based on various factors in a case that the UE supports multi-link transmission.

For example, in the case that the determining unit 301 determines that the UE supports dynamical power sharing between links, the distributing unit 302 may execute power distribution based on one or more of the following: a category of the service carried by a link, a priority level of the service carried by a link, a reliability requirement of a link, and a transmission range of a link. Specifically, power may be distributed preferentially to the following links: links with a high priority level of service, links with high reliability requirement, links with a large transmission range, and links carrying safety-related service. The power requirements of the links to which the power is distributed preferentially are met preferentially.

The information about whether the UE supports dynamic power sharing among links may be pre-configured or pre-stored in the UE. The information about the order in which power distribution is executed for the links may also be pre-configured or pre-stored in the UE.

In addition, in an embodiment, as shown by the dashed line block in FIG. 8, the electronic apparatus 300 may further include an acquiring unit 303, configured to acquire a dynamic power sharing indication via a RRC signaling or an SIB. The determining unit 301 determines whether the UE supports dynamic power sharing among links based on the dynamic power sharing indication.

In addition, the acquiring unit 303 may further acquire configuration information for power distribution. The configuration information includes information about the order in which power distribution is executed for the links. For example, the configuration information includes information about the factors based on which the order of power distribution is determined or information about the order specified by the base station. The configuration information may be acquired, for example, via the RRC signaling or the SIB.

The distributing unit 302 is further configured to adjust the power distribution in response to joining of a new link. The adjustment may be executed during the transmission process on the existing links, or may be executed after the transmission process on the existing link is completed.

In summary, with the electronic apparatus 300 according to the embodiment of the present disclosure, dynamic power sharing among multiple links can be performed, thereby improving the flexibility of power distribution.

Accordingly, an electronic apparatus arranged on a base station side is further provided according to the embodiment of the present disclosure. The electronic apparatus includes processing circuitry. The processing circuitry is configured to generate, for UE supporting multi-link transmission, an indication indicating whether the UE supports dynamic power sharing, and provide the indication to the UE. The electronic apparatus provides the indication, for example, via a RRC signaling or an SIB.

The processing circuitry may be further configured to generate configuration information for power distribution. The configuration information includes information about an order in which the UE executes power distribution for the links. As mentioned above, the configuration information may include information about the factors based on which the order of power distribution is determined or information about the order specified by the base station. The configuration information may also be sent, for example, via the RRC signaling or the SIB.

Fourth Embodiment

FIG. 9 is a block diagram showing functional modules of an electronic apparatus 400 for wireless communications according to another embodiment of the present disclosure. As shown in FIG. 9, the electronic apparatus 400 includes: a determining unit 401, configured to determine a measurement configuration for measuring a RSSI of an NR sidelink, wherein the measurement configuration includes information indicating positions of OFDM symbols for measurement of the RSSI in a subframe; and an executing unit 402, configured to execute the measurement of the received signal strength indication of the NR sidelink based on the measurement configuration.

The determining unit 401 and the executing unit 402 may be implemented by one or more processing circuitries, and the processing circuitry, for example, may be implemented as a chip or a processor. Moreover, it should be noted that, functional units in the electronic apparatus shown in FIG. 9 are only logic modules which are divided based on the specific functions thereof, and are not intended to limit the implementations.

The electronic apparatus 400, for example, may be arranged on UE side or may be communicatively connected to a UE. It should be noted that the electronic apparatus 400 may be implemented at a chip level or a device level. For example, the electronic apparatus 400 may function as user equipment, and may include an external device such as a memory and a transceiver (not shown in FIG. 9). The memory may be configured to store programs and related data information for implementing various functions by the user equipment. The transceiver may include one or more communication interfaces to support communication with different devices (for example, a base station, other user equipment or the like). The implementation of the transceiver is not limited here.

The measurement configuration in the embodiment indicates which OFDM symbols in the subframe are involved in measuring the RSSI of the NR sidelink (hereinafter referred to as S-RSSI of the NR). FIG. 10 shows an example of a subframe #n in an NR system, where the subcarrier interval is 30 kHz. As shown in FIG. 10, the subframe #n includes two slots. Each slot includes 14 OFDM symbols numbered from #0 to #13, and each slot includes two mini-slots.

For example, the measurement configuration may indicate to measure the OFDM symbols numbered from #0 to #6 in the time slot #1 and the OFDM symbols numbered from #8 to #9 OFDM in the time slot #2. Alternatively, the measurement configuration may indicate to measure only the OFDM symbols in the mini-slot #2. It should be understood that the measurement configuration described herein is only an example, and in the embodiment, the measurement configuration may be dynamically configured and thus may have any form.

In addition, the measurement configuration may be statically configured. For example, certain OFDM symbols are fixed to be measured, or one certain or several certain time slots or mini-slots are fixed to be measured.

For example, the determining unit 401 may be configured to acquire the measurement configuration via a RRC signaling or an SIB. Alternatively, the measurement configuration may be pre-configured in the user equipment, or the determining unit 401 is configured to determine the measurement configuration based on the requirements of the user equipment.

In an example, multiple measurement modes may be pre-specified. In each of the measurement modes, certain OFDM symbols are fixed to be measured. The measurement configuration may include information of specification of the measurement mode.

In addition, the measurement configuration may be dependent on one or more of the following: a resource pool of the NR sidelink, an NR subcarrier, and communication system parameters of an NR communication system.

In an example, the executing unit 402 may be configured to execute measurement on the OFDM symbols indicated in the measurement configuration in a predetermined time unit, and calculate a linear average value of received power of the respective OFDM symbols in the predetermined time unit as a measurement value of the S-RSSI of the NR, wherein the predetermined time unit is a subframe, a time slot or a mini-slot.

In addition, based on the measured S-RSSI, the CBR of the NR sidelink may also be defined as: a proportion of sub-channels having a S-RSSI exceeding a predetermined threshold measured within a predetermined time period in the resource pool configured to the NR sidelink. The predetermined time period is, for example, several subframes, several time slots or several mini-slots.

It should be noted that the measurement configuration in the embodiment may be included in the CBR measurement configuration.

Accordingly, an electronic apparatus 500 for wireless communications arranged on a base station side is further provided according to the embodiment. FIG. 11 is a block diagram showing functional modules of the electronic apparatus 500. As shown in FIG. 11, the electronic apparatus 500 includes: a generating unit 501, configured to generate a measurement configuration for measuring a RSSI of an NR sidelink, wherein the measurement configuration includes information indicating positions of OFDM symbols for measurement of the RSSI in a subframe; and a providing unit 502, configured to provide the measurement configuration to user equipment.

Similarly, the generating unit 501 and the providing unit 502 may be implemented by one or more processing circuitries, and the processing circuitry, for example, may be implemented as a chip or a processor.

In an embodiment, the generating unit 501 is configured to generate the measurement configuration based on one or more of the following: a resource pool of the NR sidelink, an NR subcarrier, and communication system parameters of the NR communication system.

The providing unit 502 may provide the measurement configuration to the user equipment via a RRC signaling or an SIB.

With the electronic apparatus 400 and the electronic apparatus 500 according to the embodiment, flexible measurement configuration for measurement of the S-RSSI of NR can be realized.

Fifth Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

FIG. 12 is a flow chart of a method for wireless communications according to an embodiment of the present disclosure. The method includes: determining whether it is required to execute both a first CBR measurement on a first resource pool of an LTE sidelink and a second CBR measurement on a second resource pool of an NR sidelink currently (S11); and in a case of determining it is required to execute both the first CBR measurement and the second CBR measurement currently, executing, at least based on a co-existence CBR measurement configuration, the first CBR measurement and/or the second CBR measurement (S12). The method may be implemented for example at the UE side.

At least a part of the co-existence CBR measurement configuration may be acquired via a RRC signaling or an SIB. At least a part of the co-existence CBR measurement configuration may be pre-configured or pre-stored in UE.

For example, the co-existence CBR measurement configuration includes a determination rule for a solution of executing the first CBR measurement and the second CBR measurement in a case that capability of the user equipment available for a CBR measurement cannot meet a requirement.

The determination rule includes, for example, one or more of the following: whether to allow initiation of another CBR measurement during a period of a CBR measurement being executed; whether to allow reuse of a measurement result of the first CBR measurement and a measurement result of the second CBR measurement in a case that the first resource pool and the second resource pool overlap with each other; alternately executing the first CBR measurement and the second CBR measurement within a measurement window; and executing only one of the first CBR measurement and the second CBR measurement within the measurement window. The measurement window is a window of the first CBR measurement or a window of the second CBR measurement.

The determination rule may further include a selection rule for selecting the first CBR measurement or the second CBR measurement, and the selection rule is based on one or more of the following: pre-determination; historical conditions of the first CBR measurement and historical conditions of the second CBR measurement; a service requirement of the LTE sidelink and a service requirement of the NR sidelink; and a power requirement of the first CBR measurement and a power requirement of the second CBR measurement.

For example, the determination rule includes executing only one of the first CBR measurement and the second CBR measurement within the measurement window, and in step S12, it is determined to execute which one of the first CBR measurement and the second CBR measurement based on the historical conditions of the first CBR measurement and the historical conditions of the second CBR measurement. The number of times that the first CBR measurement is continuously executed or the number of times that the second CBR measurement is continuously executed does not exceed a predetermined threshold.

For example, the determination rule includes executing only one of the first CBR measurement and the second CBR measurement within a measurement window, and in step S12, it is determined to execute which one of the first CBR measurement and the second CBR measurement based on the service requirement of the LTE sidelink and the service requirement of the NR sidelink. The service requirement includes one or more of the following aspects: a delay requirement, a reliability requirement, and a service category For example, the determination rule includes allowing the reuse of the measurement result of the first CBR measurement and the measurement result of the second CBR measurement in the case that the first resource pool and the second resource pool overlap with each other, and in the step S12 the measurement result of the first CBR measurement and the measurement result of the second CBR measurement are reused in a case that a subframe structure of the LTE sidelink is the same as a subframe structure of the NR sidelink.

The co-existence CBR measurement configuration further includes configuration for measurement report, and the configuration for measurement report includes reporting to an NR base station a case that the second CBR measurement continuously fails for a predetermined number of times.

In addition, the co-existence CBR measurement configuration may further include allowing the first CBR measurement and the second CBR measurement to be executed in parallel in a case that the capability of the user equipment available for the CBR measurement can meet the requirement. The co-existence CBR measurement configuration further includes configuration of whether to support dynamic power sharing between the first CBR measurement and the second CBR measurement in a case that the first CBR measurement and the second CBR measurement are executed in parallel.

FIG. 13 is a flow chart of a method for wireless communications according to an embodiment of the present disclosure. The method includes: generating a co-existence CBR measurement configuration, for use by UE to determine, in a case that it is required to execute both a first CBR measurement on a first resource pool of an LTE sidelink and a second CBR measurement on a second resource pool of an NR sidelink, a solution of executing the first CBR measurement and the second CBR measurement (S21); and providing the co-existence CBR measurement configuration to the UE (S22). The method, for example, may be performed on a base station side.

In step S22, the co-existence CBR measurement configuration may be provided to the UE via a RRC signaling or an SIB. The details of the co-existence CBR measurement configuration have been described, and are not repeated herein.

FIG. 14 is a flow chart of a method for wireless communications according to an embodiment of the present disclosure. The method includes: in a case that UE supports multi-link transmission, determining whether the UE supports dynamical power sharing among links (S32); and in a case of determining that the UE supports dynamical power sharing among links, dynamically distribute a total transmission power among multiple links (S33). The method may be performed, for example, on UE side.

The multiple links includes, for example, two or more of the following: LTE uplink, LTE sidelink, NR uplink, and NR sidelink.

As shown by a dashed line block in FIG. 14, the method may further include a step S31: acquiring a dynamic power sharing indication via a RRC signaling or an SIB. Further, in step S32, it is determined whether the UE supports dynamic power sharing among links based on the dynamic power sharing indication. Alternatively, information about whether the UE supports dynamic power sharing among links is pre-configured or pre-stored in the UE.

In step S31, configuration information for power distribution may be further acquired. The configuration information includes information about an order in which power distribution is executed for the links.

In step S33, power distribution may be executed based on one or more of the following: a category of the service carried by a link, a priority level of the service carried by a link, a reliability requirement of a link, and a transmission range of a link.

As shown by another dashed line block in FIG. 14, the method may further include adjusting the power distribution in response to joining of a new link.

FIG. 15 is a flow chart of a method for wireless communications according to another embodiment of the present disclosure. The method includes: determining a measurement configuration for measuring a RSSI of an NR sidelink (S41), where the measurement configuration includes information indicating positions of OFDM symbols for measurement of the RSSI in a subframe; and executing RSSI measurement on the NR sidelink based on the measurement configuration (S42). The method, for example, may be performed on UE side.

The measurement configuration may be acquired via a RRC signaling or an SIB. Alternatively, the measurement configuration may be pre-configured in user equipment, or determined based on requirements of the user equipment.

The measurement configuration may be dependent on one or more of the following: a resource pool of the NR sidelink, an NR subcarrier, and communication system parameters of an NR communication system.

In step S42, measurement may be executed on OFDM symbols indicated in the measurement configuration in a predetermined time unit, and a linear average value of received power of the respective OFDM symbols in the predetermined time unit is calculated as a measurement value of the RSSI of the NR sidelink. The predetermined time unit may be a subframe, a time slot or a mini-slot.

On this basis, the CBR of the NR sidelink may be also defined as: a proportion of sub-channels having a RSSI exceeding a predetermined threshold measured within a predetermined time period in the resource pool configured to the NR sidelink.

FIG. 16 is a flow chart of a method for wireless communications according to another embodiment of the present disclosure. The method includes: generating a measurement configuration for measuring a RSSI of an NR sidelink (S51), where the measurement configuration includes information indicating positions of OFDM symbols for measurement of the RSSI in a subframe; and providing the measurement configuration to user equipment (S52).

For example, in step S51, the measurement configuration may be generated based on one or more of the following: a resource pool of the NR sidelink, an NR subcarrier, and communication system parameters of an NR communication system. In step S52, the measurement configuration may be provided to the user equipment via a RRC signaling or an SIB.

It should be noted that the above methods may be performed in combination or separately. Details of the above methods are described in detail in the first to fourth embodiments, and are not repeated herein.

The technology according to the present disclosure is applicable to various products.

For example, the electronic apparatus 200 and 500 may be implemented as various base stations. The base station may be implemented as any type of evolved node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include: a main body (also referred to as a base station apparatus) configured to control wireless communication; and one or more remote radio head ends (RRH) located at positions different from the main body. In addition, various types of user equipments may each serve as a base station by performing functions of the base station temporarily or semi-permanently.

The electronic apparatuses 100, 300, and 400 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

APPLICATION EXAMPLES REGARDING A BASE STATION

First Application Example

FIG. 17 is a block diagram showing a first example of an exemplary configuration of a gNB to which technology according to the present disclosure may be applied. A gNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 17, the gNB 800 may include the multiple antennas 810. For example, the multiple antennas 810 may be compatible with multiple frequency bands used by the gNB 800. Although FIG. 17 shows the example in which the gNB 800 includes the multiple antennas 810, the gNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB, a gNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another gNB or eNB via the network interface 823. In this case, the gNB 800, and the core network node or another gNB or eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the gNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 17, the radio communication interface 825 may include the multiple BB processors 826. For example, the multiple BB processors 826 may be compatible with multiple frequency bands used by the gNB 800. The radio communication interface 825 may include multiple RF circuits 827, as shown in FIG. 17. For example, the multiple RF circuits 827 may be compatible with multiple antenna elements. Although FIG. 17 shows the example in which the radio communication interface 825 includes the multiple BB processors 826 and the multiple RF circuits 827, the radio communication interface 825 may also include a single BB processor 826 and a single RF circuit 827.

In the gNB 800 shown in FIG. 17, a transceiver of the electronic apparatus 200 or 500 may be implemented by the radio communication interface 825. At least a part of the functions may also be implemented by the controller 821. For example, the controller 821 may perform the functions of the generating unit 201 and the providing unit 202 to provide the co-existence CBR measurement configuration to the UE, or perform the functions of the generating unit 501 and the providing unit 502 to provide the measurement configuration for measuring the RSSI to the UE.

Second Application Example

FIG. 18 is a block diagram showing a second example of the exemplary configuration of a gNB to which the technology according to the present disclosure may be applied. A gNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 18, the gNB 830 may include the multiple antennas 840. For example, the multiple antennas 840 may be compatible with multiple frequency bands used by the gNB 830. Although FIG. 18 shows the example in which the gNB 830 includes the multiple antennas 840, the gNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except that the BB processor 856 is connected to an RF circuit 864 of the RRH 860 via the connection interface 857. As show in FIG. 18, the radio communication interface 855 may include the multiple BB processors 856. For example, the multiple BB processors 856 may be compatible with multiple frequency bands used by the gNB 830. Although FIG. 18 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 18. For example, the multiple RF circuits 864 may support multiple antenna elements. Although FIG. 18 shows the example in which the radio communication interface 863 includes the multiple RF circuits 864, the radio communication interface 863 may also include a single RF circuit 864.

In the gNB 830 shown in FIG. 18, a transceiver of the electronic apparatus 200 or 500 may be implemented by the radio communication interface 825. At least a part of the functions may also be implemented by the controller 821. For example, the controller 821 may perform the functions of the generating unit 201 and the providing unit 202 to provide the co-existence CBR measurement configuration to the UE, or perform the functions of the generating unit 501 and the providing unit 502 to provide the measurement configuration for measuring the RSSI to the UE.

APPLICATION EXAMPLES REGARDING USER EQUIPMENT

First Application Example

FIG. 19 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 19 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 19. Although FIG. 19 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 19. Although FIG. 19 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 19 via feeder lines that are partially shown as dashed lines in FIG. 19. The auxiliary controller 919, operates a minimum necessary function of the smart phone 900, for example, in a sleep mode.

In the smartphone 900 shown in FIG. 19, the transceiver of the electronic apparatus 100, the transceiver of the electronic apparatus 300, or the transceiver of the electronic apparatus 400 may be implemented by the radio communication interface 912. At least a part of the functions may be implemented by the processor 901 or the auxiliary controller 919. For example, the processor 901 or the auxiliary controller 919 may perform the functions of the determining unit 101 and the executing unit 102 to perform the first CBR measurement and the second CBR measurement based on the co-existence CBR measurement configuration, or may perform the functions of the determining unit 301, the distributing unit 302 and the acquiring unit 303 to realize dynamic power sharing among multiple links, or may perform the functions of the determining unit 401 and the executing unit 402 to perform S-RSSI measurement based on the measurement configuration for measuring S-RSSI.

Second Application Example

FIG. 20 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sound for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 20. Although FIG. 20 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 20, the car navigation apparatus 920 may include the multiple antennas 937. Although FIG. 20 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 20 via feeder lines that are partially shown as dash lines in FIG. 20. The battery 938 accumulates power supplied from the vehicle.

In the car navigation device 920 shown in FIG. 20, the transceiver of the electronic apparatus 100, the transceiver of the electronic apparatus 300, or the transceiver of the electronic apparatus 400 may be implemented by the radio communication interface 912. At least a part of the functions may be implemented by the processor 901 or the auxiliary controller 919. For example, the processor 901 or the auxiliary controller 919 may perform the functions of the determining unit 101 and the executing unit 102 to perform the first CBR measurement and the second CBR measurement based on the co-existence CBR measurement configuration, or may perform the functions of the determining unit 301, the distributing unit 302 and the acquiring unit 303 to realize dynamic power sharing among multiple links, or may perform the functions of the determining unit 401 and the executing unit 402 to perform S-RSSI measurement based on the measurement configuration for measuring S-RSSI.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 2100 shown in FIG. 21) from a storage medium or network, wherein the computer is capable of implementing various functions when installed with various programs.

In FIG. 21, a central processing unit (CPU) 2101 executes various processing according to a program stored in a read-only memory (ROM) 2102 or a program loaded to a random access memory (RAM) 2103 from a memory section 2108. The data needed for the various processing of the CPU 2101 may be stored in the RAM 2103 as needed. The CPU 2101, the ROM 2102 and the RAM 2103 are linked with each other via a bus 2104. An input/output interface 2105 is also linked to the bus 2104.

The following components are linked to the input/output interface 2105: an input section 2106 (including keyboard, mouse and the like), an output section 2107 (including displays such as a cathode ray tube (CRT), a liquid crystal display (LCD), a loudspeaker and the like), a memory section 2108 (including hard disc and the like), and a communication section 2109 (including a network interface card such as a LAN card, modem and the like). The communication section 2109 performs communication processing via a network such as the Internet. A driver 2110 may also be linked to the input/output interface 2105, if needed. If needed, a removable medium 2111, for example, a magnetic disc, an optical disc, a magnetic optical disc, a semiconductor memory and the like, may be installed in the driver 2110, so that the computer program read therefrom is installed in the memory section 2108 as appropriate.

In the case where the foregoing series of processing is achieved through software, programs forming the software are installed from a network such as the Internet or a memory medium such as the removable medium 2111.

It should be appreciated by those skilled in the art that the memory medium is not limited to the removable medium 2111 shown in FIG. 21, which has program stored therein and is distributed separately from the apparatus so as to provide the programs to users. The removable medium 2111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2102 and the memory section 2108 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
      determine whether it is required to execute both a first channel busy rate (CBR) measurement on a first resource pool of a long term evolved (LTE) sidelink and a second CBR measurement on a second resource pool of a new radio (NR) sidelink currently; and
      in a case of determining it is required to execute both the first CBR measurement and the second CBR measurement currently, execute, at least based on a co-existence CBR measurement configuration, the first CBR measurement and/or the second CBR measurement, the co-existence CBR measurement configuration comprising a determination rule for a solution of executing the first CBR measurement and the second CBR measurement in a case that capability of the user equipment available for a CBR measurement cannot meet a requirement, and the first CBR measurement and the second CBR measurement being executed in parallel in a case that the capability of the user equipment available for the CBR measurement can meet the requirement,
   wherein the determination rule comprises one or more of the following:
      whether to allow initiation of another CBR measurement during a period of a CBR measurement being executed;
      whether to allow reuse of a measurement result of the first CBR measurement and a measurement result of the second CBR measurement in a case that the first resource pool and the second resource pool overlap with each other, and the processing circuitry is configured to reuse the measurement result of the first CBR measurement and the measurement result of the second CBR measurement in a case that a subframe structure of the LTE sidelink is the same as a subframe structure of the NR sidelink;
      alternately executing the first CBR measurement and the second CBR measurement within a measurement window; and
      executing only one of the first CBR measurement and the second CBR measurement within the measurement window.

2. The electronic apparatus according to claim 1, wherein the processing circuitry is configured to acquire at least a part of the co-existence CBR measurement configuration via a radio resource control signaling or a system information block, or
   wherein the at least a part of the co-existence CBR measurement configuration is pre-configured or pre-stored in user equipment.

3. The electronic apparatus according to claim 1, wherein the measurement window is a window of the first CBR measurement or a window of the second CBR measurement.

4. The electronic apparatus according to claim 1, wherein the determination rule further comprises a selection rule for selecting the first CBR measurement or the second CBR measurement, and the selection rule is based on one or more of the following:
   pre-specification;
   historical conditions of the first CBR measurement and historical conditions of the second CBR measurement;
   a service requirement of the LIE sidelink and a service requirement of the NR sidelink; and
   a power requirement of the first CBR measurement and a power requirement of the second CBR measurement.

5. The electronic apparatus according to claim 4, wherein the determination rule comprises executing only one of the first CBR measurement and the second CBR measurement within a measurement window,
   the processing circuitry is configured to: determine to execute which one of the first CBR measurement and the second CBR measurement based on the historical conditions of the first CBR measurement and the historical conditions of the second CBR measurement, and the number of times that the first CBR measurement is continuously executed or the number of times that the second CBR measurement is continuously executed does not exceed a predetermined threshold; or
   determine to execute which one of the first CBR measurement and the second CBR measurement based on the service requirement of the LIE sidelink and the service requirement of the NR sidelink.

6. The electronic apparatus according to claim 5, wherein the service requirement comprises one or more of the following aspects: a delay requirement, a reliability requirement, and a service category.

7. The electronic apparatus according to claim 1, wherein the co-existence CBR measurement configuration further comprises configuration for measurement report, and the configuration for measurement report comprises reporting to an NR base station a case that the second CBR measurement continuously fails for a predetermined number of times.

8. The electronic apparatus according to claim 1, wherein the co-existence CBR measurement configuration further comprises configuration of whether to support dynamic power sharing between the first CBR measurement and the second CBR measurement in a case that the first CBR measurement and the second CBR measurement are executed in parallel.

9. An electronic apparatus for wireless communications, comprising:
processing circuitry, configured to:
in a case that user equipment supports multi-link transmission, determine whether the user equipment supports dynamical power sharing among links; and
in a case of determining that the user equipment supports dynamical power sharing among links, dynamically distribute a total transmission power among multiple links,
wherein the processing circuitry determines whether it is required to execute both a first channel busy rate (CBR) measurement on a first resource pool of a long term evolved (LTE) sidelink and a second CBR measurement on a second resource pool of a new radio (NR) sidelink currently,
wherein, in a case of determining, it is required to execute both the first CBR measurement and the second CBR measurement currently, the processing circuitry executes, at least based on a co-existence CBR measurement configuration, the first CBR measurement and/or the second CBR measurement, the co-existence CBR measurement configuration comprising a determination rule for a solution of executing the first CBR measurement and the second CBR measurement in a case that capability of the user equipment available for a CBR measurement cannot meet a requirement, and the first CBR measurement and the second CBR measurement being executed in parallel in a case that the capability of the user equipment available for the CBR measurement can meet the requirement,
wherein the determination rule comprises one or more of the following:
whether to allow initiation of another CBR measurement during a period of a CBR measurement being executed;
whether to allow reuse of a measurement result of the first CBR measurement and a measurement result of the second CBR measurement in a case that the first resource pool and the second resource pool overlap with each other, and the processing circuitry is configured to reuse the measurement result of the first CBR measurement and the measurement result of the second CBR measurement in a case that a subframe structure of the LTE sidelink is the same as a subframe structure of the NR sidelink;
alternately executing the first CBR measurement and the second CBR measurement within a measurement window; and
executing only one of the first CBR measurement and the second CBR measurement within the measurement window.

10. The electronic apparatus according to claim 9, wherein the multiple links comprise two or more of the following: LTE uplink, LTE sidelink, NR uplink, and NR sidelink.

11. The electronic apparatus according to claim 9, wherein the processing circuitry is further configured to acquire a dynamic power sharing indication via a radio resource control signaling or a system information block, and determine whether the user equipment supports dynamic power sharing among links based on the dynamic power sharing indication; or wherein information about whether the user equipment supports dynamic power sharing among links is pre-configured or pre-stored in the user equipment.

12. The electronic apparatus according to claim 9, wherein the processing circuitry is further configured to acquire configuration information for power distribution, wherein the configuration information comprises information about an order in which power distribution is executed for the links; or
wherein the processing circuitry is configured to execute power distribution based on one or more of the following: a category of the service carried by a link, a priority level of the service carried by a link, a reliability requirement of a link, and a transmission range of a link.

13. The electronic apparatus according to claim 9, wherein the processing circuitry is further configured to adjust the power distribution in response to joining of a new link.

14. An electronic apparatus for wireless communications, comprising:
processing circuitry, configured to:
determine a measurement configuration for measuring a received signal strength indication of a new radio (NR) sidelink, wherein the measurement configuration comprises information indicating positions of orthogonal frequency division multiplexing symbols for measurement of the received signal strength indication in a subframe; and
execute the measurement of the received signal strength indication of the NR sidelink based on the measurement configuration,
wherein the processing circuitry determines whether it is required to execute both a first channel busy rate (CBR) measurement on a first resource pool of a long term evolved (UTE) sidelink and a second CBR measurement on a second resource pool of the NR sidelink currently,
wherein in a case of determining it is required to execute both the first CBR, measurement and the second CBR measurement currently, the processing circuitry executes, at least based on a co-existence CBR measurement configuration, the first CBR measurement and/or the second CBR measurement the co-existence CBR measurement configuration comprising a determination rule for a solution of executing the first CBR measurement and the second CBR measurement in a case that capability of the user equipment available for a CBR measurement cannot meet a requirement, and the first CBR measurement and the second CBR measurement being executed in parallel in a case that the capability of the user equipment available for the CBR measurement can meet the requirement,
wherein the determination rule comprises one or more of the following:
whether to allow initiation of another CBR measurement during a period of a CBR measurement being executed;
whether to allow reuse of a measurement result of the first CBR measurement and a measurement result of the second CBR measurement in a case that the first resource pool and the second resource pool overlap with each other, and the processing circuitry is configured to reuse the measurement result of the first CBR measurement and the measurement result of the second CBR measurement in a case that a subframe structure of the LTE sidelink is the same as a subframe structure of the NR sidelink;

alternately executing the first CBR measurement and the second CBR measurement within a measurement window; and executing only one of the first CBR measurement and the second CBR measurement within the measurement window.

15. The electronic apparatus according to claim 14, wherein the processing circuitry is configured to acquire the measurement configuration via a radio resource control signaling or a system information block; or wherein the measurement configuration is pre-configured in user equipment, or the processing circuitry is configured to determine the measurement configuration based on requirements of the user equipment.

16. The electronic apparatus according to claim 14, wherein the processing circuitry is configured to execute measurement on orthogonal frequency division multiplexing symbols indicated in the measurement configuration in a predetermined time unit, and calculate a linear average value of received power of respective orthogonal frequency division multiplexing symbols in the predetermined time unit as a measurement value of the received signal strength indication of the NR sidelink, wherein the predetermined time unit is a subframe, a time slot or a mini-slot.

17. The electronic apparatus according to claim 16, wherein the processing circuitry is further configured to define the CBR of the NR sidelink as: a proportion of sub-channels having a received signal strength indication exceeding a predetermined threshold measured within a predetermined time period in the resource pool configured to the NR sidelink.

* * * * *